(12) United States Patent
Iguchi et al.

(10) Patent No.: US 8,143,751 B2
(45) Date of Patent: Mar. 27, 2012

(54) MOTOR AND RECORDING DISK DRIVE APPARATUS

(75) Inventors: Takuro Iguchi, Kyoto (JP); Hironori Ando, Kyoto (JP); Toshihiro Akiyama, Kyoto (JP); Takunori Shinao, Kyoto (JP)

(73) Assignee: Nidec Corporation, Kyoto (JP)

( * ) Notice: Subject to any disclaimer, the term of this patent is extended or adjusted under 35 U.S.C. 154(b) by 285 days.

(21) Appl. No.: 12/697,641

(22) Filed: Feb. 1, 2010

(65) Prior Publication Data

US 2010/0202080 A1 Aug. 12, 2010

(30) Foreign Application Priority Data

Feb. 10, 2009 (JP) .................................. 2009-028844

(51) Int. Cl.
*H02K 7/00* (2006.01)
(52) U.S. Cl. ........................ 310/67 R; 310/90
(58) Field of Classification Search ................ 310/67 R, 310/89–90
See application file for complete search history.

(56) References Cited

U.S. PATENT DOCUMENTS

| | | | |
|---|---|---|---|
| 5,686,771 A | 11/1997 | Ishizuka et al. | |
| 7,265,467 B2 | 9/2007 | Sumi | |
| 7,745,968 B2 * | 6/2010 | Kodama et al. | ................. 310/90 |
| 2003/0133633 A1 * | 7/2003 | Nakamura | ..................... 384/107 |
| 2003/0197438 A1 * | 10/2003 | Oku | ................................. 310/90 |
| 2004/0104634 A1 * | 6/2004 | Nishimura et al. | ............. 310/90 |
| 2005/0006965 A1 * | 1/2005 | Sato et al. | .................... 310/67 R |
| 2008/0218019 A1 | 9/2008 | Sumi | |
| 2009/0133244 A1 * | 5/2009 | Iguchi et al. | ..................... 29/596 |
| 2010/0195250 A1 * | 8/2010 | Sekii et al. | ................. 360/234.1 |

FOREIGN PATENT DOCUMENTS

| | | |
|---|---|---|
| JP | 01-129745 | 5/1989 |
| JP | 6-30945 | 4/1994 |
| JP | 6-36378 | 5/1994 |
| JP | 07-336929 | 12/1995 |
| JP | 08-017133 | 1/1996 |
| JP | 2002-199654 | 7/2002 |
| JP | 2005-155912 | 6/2005 |

* cited by examiner

*Primary Examiner* — Thanh Lam
(74) *Attorney, Agent, or Firm* — Keating & Bennett, LLP

(57) ABSTRACT

A rotor unit includes a substantially circular plate shaped cover portion, a rotor hub including a lower cylinder portion, and a magnetic field generating member attached on the lower cylinder portion. An annular salient portion is provided on the lower surface of the cover portion 31. The annular salient portion lies radial inwards of the lower opening of the through-hole of the cover portion and protrudes downwards in the shape of a ring whose center coincides with the central axis. The magnetic field generating member includes a rotor magnet and a back iron covering the outer surface and upper surface of the rotor magnet. When the magnetic field generating member is mounted to the rotor hub, the upper portion of the back iron comes in contact with the annular salient portion, which determines the axial position of the magnetic field generating member.

14 Claims, 11 Drawing Sheets

MOTOR AND RECORDING DISK DRIVE APPARATUS

BACKGROUND OF THE INVENTION

1. Field of the Invention

The present invention relates to an electric motor and a recording disk drive apparatus provided with the motor.

2. Description of the Related Art

Conventionally, a hard disk drive, one of the recording disk drive apparatuses, includes a spindle motor arranged to rotate a recording disk (hereinafter simply referred to as a "motor"). The motor includes a closed-top rotor hub having thread holes arranged to use in fastening the disk. A clamper is attached to the top surface of the rotor hub. Thus, the recording disk is fixed to the rotor hub with the lower surface thereof making contact with the disk mounting portion of the rotor hub. The thread holes are defined in the form of through-holes so that the rotor hub can be easily cleansed during the course of manufacturing the motor.

In one example of such rotor hubs, a rotor magnet arranged to generate torque and a back iron arranged to reduce the loss of a magnetomotive force are attached between the rotor hub and the stator with coils. The back iron is made of a ferromagnetic material such as stainless steel or the like and is fixed to the rotor hub by bonding, press-fit, etc.

Japanese Patent Laid-open Publication No. 1989-129745 discloses a motor for a disk drive apparatus, which includes a rotor frame having a cylindrical portion and a disc-shaped portion. As recited on lines 2 through 12 of the left lower column in page 4 of Japanese Patent Laid-open Publication No. 1989-129745, the motor for a disk drive apparatus is configured such that the disc-shaped portion of the rotor frame makes contact with disk-fastening thread holes defined as through-holes. As a result, the disk-fastening thread holes are closed at one ends thereof, which prevents metal particles from infiltrating into the motor.

Japanese Patent Laid-open Publication No. 2002-199654 discloses a method for manufacturing a fluid bearing motor. Paragraph 0034 thereof reads: the motor hub 6 and the sleeve 3 are made of, e.g., aluminum, and formed into a unitary molded product 14, the front surface of which may be plated with nickel in a thickness of d1.

However, if the rotor frame or the back iron makes contact with the through-holes as disclosed in Japanese Patent Laid-open Publication No. 1989-129745, burrs are dropped from around the through-holes. This may be a cause of generating metal particles or dust. In addition, the vertical position of the back iron is deviated by the burrs thus dropped, which may lead to increased vibration of the motor. Production cost is increased if a sheet-like seal member is attached to the through-holes in the process of manufacturing the motor.

SUMMARY OF THE INVENTION

In order to overcome the problems described above, a preferred embodiment of the present invention provides a motor including a stator unit, a rotor unit rotatable with respect to the stator unit and a bearing mechanism arranged to support the rotor unit in such a manner as to permit rotation of the rotor unit about a central axis with respect to the stator unit.

The rotor unit includes a rotor hub, which defines at least a cover portion of the rotor unit, and an annular magnetic field generating member arranged below the cover portion.

The cover portion of the rotor unit includes a vertically-pierced through-hole and a lower opening positioned in a lower portion of the through-hole and opposed to the magnetic field generating member.

One of the cover portion and the magnetic field generating member includes an annular salient portion provided radially inwards of the lower opening, the annular salient portion protruding annularly about the central axis toward, and making contact with, the other of the cover portion and the magnetic field generating member.

With the present invention, it is possible to hermetically seal the lower opening of the through-hole while preventing the back iron from making contact with the lower opening of the through-hole.

Other features, elements, steps, characteristics and advantages of the present invention will become more apparent from the following detailed description of preferred embodiments of the present invention with reference to the attached drawings.

DETAILED DESCRIPTION OF THE INVENTION

Hereinafter, preferred embodiments of the present invention will be described with reference to the accompanying drawings. In the following description, the side at which a rotor unit 3 is arranged along a central axis J1 will be referred to as "upper" and the side at which a stator unit 2 is arranged along the central axis J1 will be referred to as "lower". However, these definitions are not intended to limit the mounting postures of the present motor and the present recording disk drive apparatus.

Figure 1:
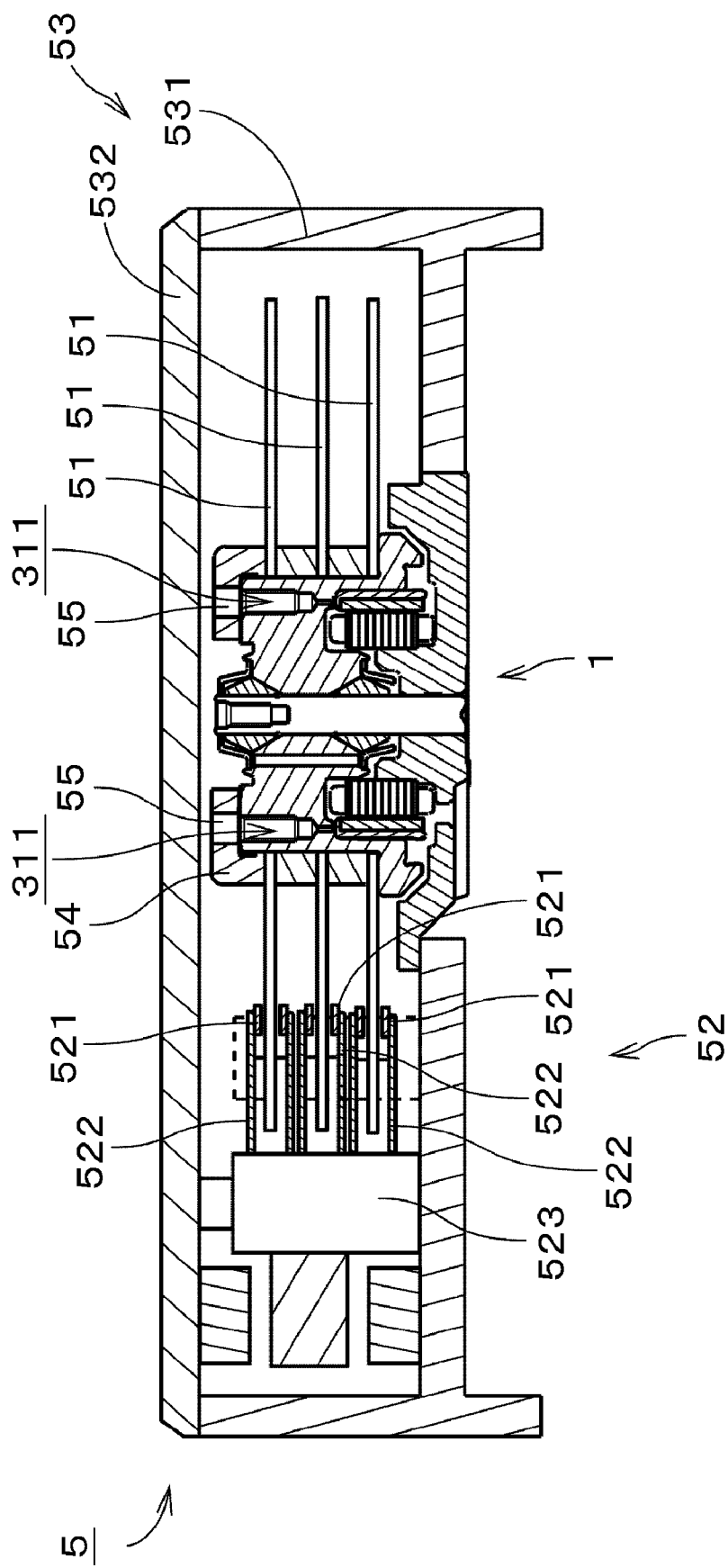
FIG. 1 is a vertical section view showing a recording disk drive apparatus according to a first preferred embodiment.

FIG. 1 is a vertical section view showing a recording disk drive apparatus 5 including an electric motor according to a first preferred embodiment. The recording disk drive apparatus 5 is a hard disk drive. The recording disk drive apparatus 5 preferably includes, e.g., three recording disks 51 arranged to record information, an electric motor 1, an access unit 52 and a housing 53. The motor 1 preferably rotates with the recording disks 51 held in place. The access unit 52 preferably performs the task of writing and/or reading information with respect to the recording disks 51.

The housing 53 preferably includes a first housing member 531 of a substantially cup-like shape, and a second housing member 532 of a substantially flat shape. The housing 53 preferably includes an internal space within which to accommodate the recording disks 51, the motor 1 and the access unit 52. The first housing member 531 is preferably provided with an opening at its top end. The motor 1 and the access unit 52 are preferably attached to the inner bottom surface of the first housing member 531. In the recording disk drive apparatus 5, the second housing member 532 is preferably bonded to the first housing member 531 to provide the housing 53, the internal space of which is clean and substantially free from dust.

Ring-shaped spacers are arranged preferably between the three recording disks 51. The motor 1 is preferably fitted through the central apertures of the recording disks 51. The recording disks 51 are preferably fixed to the motor 1 by a clamper 54 and a plurality of screws 55. The access unit 52 preferably includes a plurality of heads 521, a plurality of arms 522 and a head moving mechanism 523. The heads 521 come close to the recording disks 51 to magnetically read and/or write information. The arms 522 serve to support the heads 521 respectively. The head moving mechanism 523 preferably move the arms 522 to move the heads 521 relative to the recording disks 51 and the motor 1. With this configuration, the heads 521 arranged adjacent to the recording disks 51 gain access to the desired positions of the recording disks 51 in rotation to perform the information writing and/or reading task.

Figure 2:
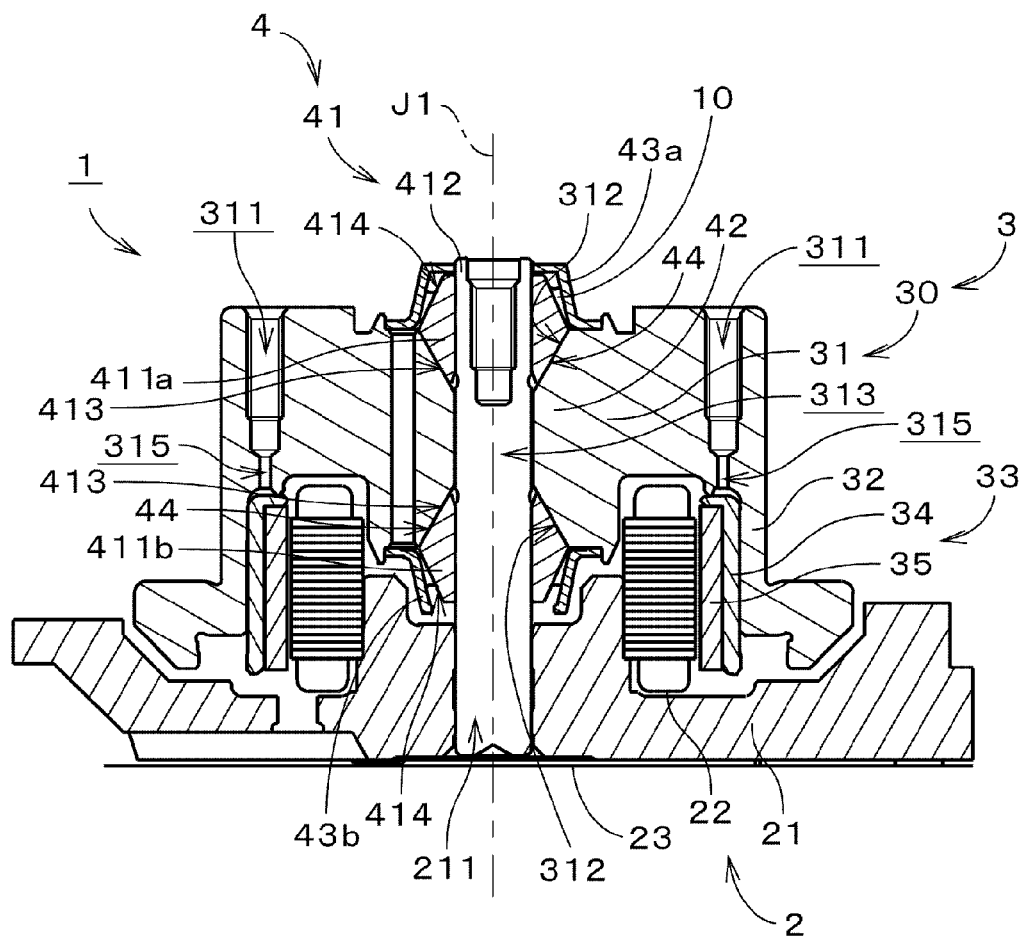
FIG. 2 is a vertical section view showing a motor.

FIG. 2 is a vertical section view showing the motor 1. The motor 1 preferably is of an outer rotor type. The motor 1 preferably includes a stator unit 2, a substantially cylindrical closed-top rotor unit 3 and a fluid dynamic pressure bearing mechanism 4 (hereinafter referred to as "bearing mechanism 4"). The bearing mechanism 4 preferably includes a shaft portion 41 fixed to the stator unit 2 and inserted into the rotor unit 3. The rotor unit 3 is preferably supported by the bearing mechanism 4 arranged to rotate about a central axis J1 relative to the stator unit 2.

In the following description, the side on which the rotor unit 3 is arranged along the central axis J1 will be referred to as "upper" and the side on which the stator unit 2 is arranged along the central axis J1 will be referred to as "lower". The central axis J1 does not necessarily coincide with the direction of gravity.

The stator unit 2 preferably includes a base bracket 21, an annular stator 22 and a plate 23. The base bracket 21 is preferably attached to the housing 53 as shown in FIG. 1. The stator 22 is preferably fixed to the base bracket 21. The plate 23 is preferably attached to the lower surface of the base bracket 21. The base bracket 21 preferably includes a central hole 211 to which the lower end extension of the shaft portion 41 is fixed. The lower end of the hole 211 is preferably closed by the plate 23.

The rotor unit 3 preferably includes a rotor hub 30 and a magnetic field generating member 33. The rotor hub 30 preferably includes a cover portion 31 and a lower cylinder portion 32 protruding downwards from the outer edge of the cover portion 31. The cover portion 31 preferably serves as a cover portion in the rotor unit 3. The magnetic field generating member 33 is preferably arranged below the cover portion 31 and outside the stator 22. The magnetic field generating member 33 preferably includes a substantially cylindrical rotor magnet 35 and a back iron 34. The back iron 34 is preferably configured to cover the outer surface and upper surface of the rotor magnet 35. The stator 22 is preferably arranged inside the rotor unit 3 so as to face an inner surface of the rotor magnet 35. In the motor 1 set forth above, an electric current is supplied from an external power source to the coils of the stator 22, whereby torque is generated between the stator 22 and the rotor magnet 35 to rotate the rotor unit 3 about the central axis J1.

The cover portion 31 preferably includes a central bore 313 defined along the central axis J1 and a plurality of through-holes 311. The through-holes 311 are preferably arranged in a circumferential direction with respect to the central axis J1 penetrating the cover portion 31 in an axial direction.

First oblique bearing surfaces 312 are defined in the upper and lower openings of the central bore 313. An inner diameter of the first oblique bearing surfaces 312 respectively become greater gradually toward the openings (hereinafter a shape of the first oblique bearing surface 312 will be referred to as "conical shape"). The through-holes 311 each have a lower opening 315 opposed to the back iron 34. As can be seen in FIG. 1, the through-holes 311 have upper portions at which screws 55 are arranged so as to fasten a clamper 54 thereto. Referring to FIG. 2, the rotor hub 30 is preferably made of, e.g., aluminum, and formed into a unitary member. In the present preferred embodiment, an inner circumferential surface of the rotor hub 30, into which the shaft portion 41 is inserted, preferably includes the first oblique bearing surfaces 312 and a circumferential surface defining the central bore 313. The inner circumferential surface of the rotor hub 30 is preferably includes a plated layer such as an electroless nickel plated layer or the like.

The bearing mechanism 4 preferably includes a shaft portion 41 and annular seal portions 43a and 43b. The shaft portion 41 is preferably inserted into the central bore 313 of the rotor hub 30. The seal portions 43a and 43b are preferably attached to the upper and lower openings of the rotor hub 30.

The shaft portion 41 preferably includes a shaft body 412 and annular members 411a and 411b provided, respectively, near the top end portion of the shaft body 412 and substantially in the middle portion of the shaft body 412. The circumferential surface (hereinafter referred to as "bearing portion 42") of the rotor hub 30 defining the central bore 313 is preferably supported by the shaft portion 41, thus functioning as a part of the bearing mechanism 4. In other words, the bearing portion 42 of the rotor hub 30 serves as a part of the rotor unit 3 and a part of the bearing mechanism 4 in the motor 1.

The annular member 411a preferably includes a second oblique bearing surface 413 and an outer oblique surface 414. The second oblique bearing surface 413 is preferably arranged at the portion of the annular member 411a inside the cover portion 31. The second oblique bearing surface 413 preferably includes a conical shape whose becomes gradually greater toward the upper opening of the cover portion 31. The second oblique bearing surface 413 is preferably arranged opposed to the first oblique bearing surfaces 312. The outer oblique surface 414 is preferably arranged in the portion of the annular member 411a protruding upwards from the cover portion 31, and includes a conical shape whose diameter becomes gradually smaller upwards.

The annular member 411b preferably includes a substantially similar shape as that of the annular member 411a. The annular member 411b is preferably fixed to the shaft body 412 as if the annular member 411a were upside-down as shown in FIG. 2. The annular member 411b preferably includes a second oblique bearing surface 413 of a substantially conical shape opposed to the corresponding one of the first oblique bearing surfaces 312 and an outer oblique surface 414 protruding downwards. In the bearing mechanism 4, the upper and lower second oblique bearing surfaces 413 preferably make contact with the first oblique bearing surfaces 312, thereby restraining the rotor unit 3 from moving with respect to the shaft portion 41 along the central axis J1 and along the direction perpendicular to the central axis J1.

Lubricant 10 is preferably arranged between the shaft portion 41 and the central bore 313, and between the shaft portion 41 and the seal members 43a and 43b. During rotation of the motor 1, the lubricant 10 as a working fluid preferably generates a fluid dynamic pressure in the two bearing gaps 44 defined between the first oblique bearing surfaces 312 and the second oblique bearing surfaces 413. This provides the bearing mechanism 4 that makes use of the fluid dynamic pressure of the lubricant 10. Thus, the rotor unit 3 is preferably supported by the stator unit 2 for rotation about the central axis J1. In addition, the plated layers provided on the first oblique bearing surfaces 312 of the rotor unit 3 assists in increasing the wear resistance of the first oblique bearing surfaces 312.

Figure 3:
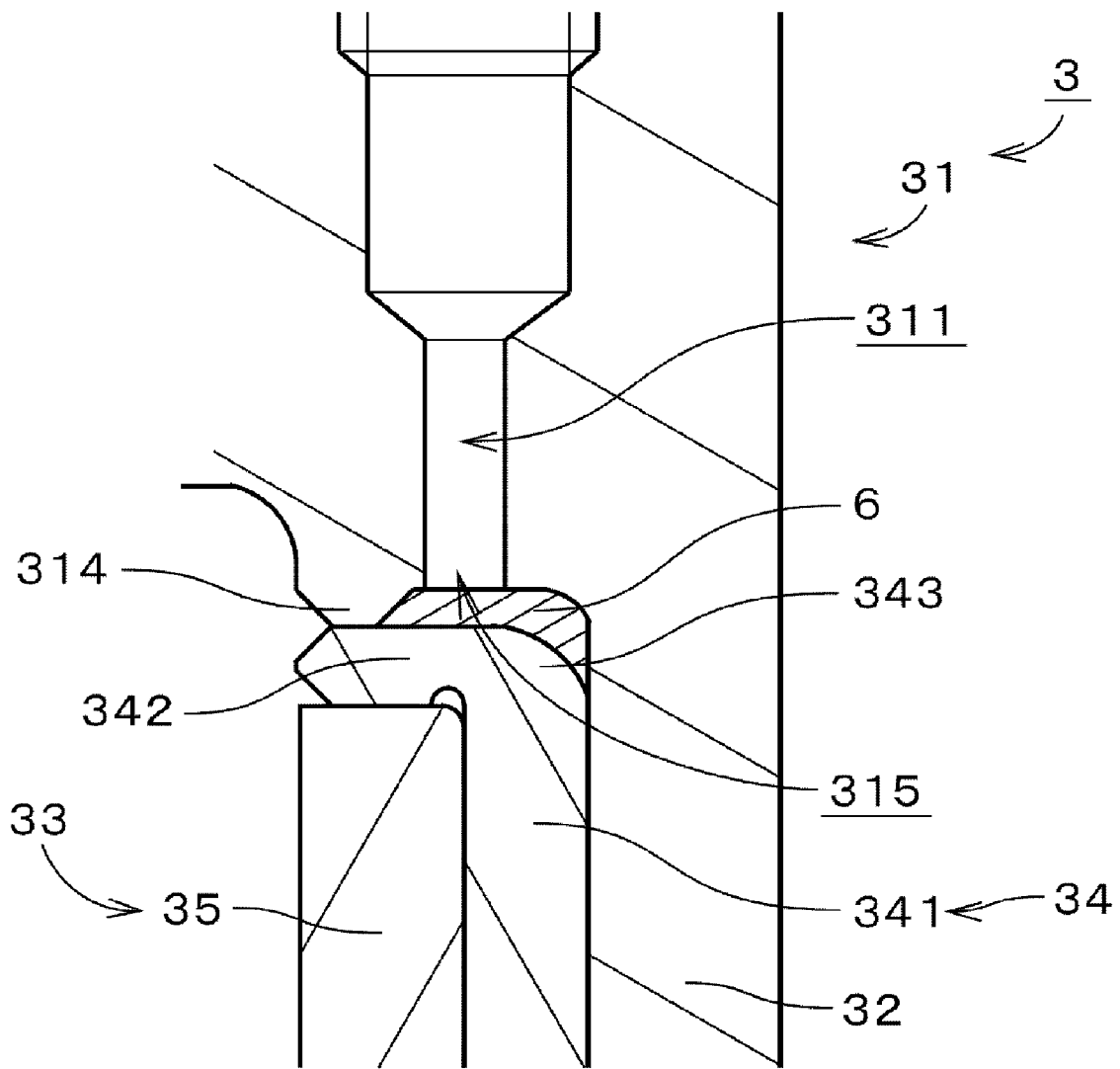
FIG. 3 is an enlarged view showing a magnetic field generating member and its vicinities.

FIG. 3 is an enlarged view showing the magnetic field generating member 33 and its vicinities in the rotor unit 3. The back iron 34 of the magnetic field generating member 33 preferably includes a cylinder portion 341 and a circular plate portion 342. The circular plate portion 342 preferably extends radially inwards from the top end of the cylinder portion 341 toward the central axis J1 (see FIG. 2). The back iron 34 is preferably formed into a unitary member by press-forming a flat member made of stainless steel or other ferromagnetic materials. The cylinder portion 341 is preferably thicker than the circular plate portion 342. The inner surface of the cylinder portion 341 and the lower surface of the circular plate portion 342 preferably make contact with the outer surface and upper surface of the rotor magnet 35, respectively. The back iron 34 further includes a corner portion 343 where the outer surface of the cylinder portion 341 meets with the upper surface of the circular plate portion 342. The corner portion 343 is preferably press-formed, or the like, so that the cross section thereof taken along a plane containing the central axis J1 includes a substantially arc-like shape. The curvature radius of the outer surface of the corner portion 343 is greater than the curvature radius of the portion of the rotor unit 3 where the lower surface of the cover portion 31 meets with the inner surface of the lower cylinder portion 32.

An annular salient portion 314 is preferably arranged at the lower surface of the cover portion 31. The annular salient portion 314 is preferably arranged radially inwards of the lower openings 315 of the through-holes 311 and protrudes downwards in the shape of a ring whose center coincides with the central axis J1. The outer surface of the cylinder portion 341 is preferably attached to the inner surface of the lower cylinder portion 32. An upper portion of the back iron 34, i.e., the upper surface of the circular plate portion 342, makes contact with the lower end of the annular salient portion 314. This configuration ensures that the back iron 34 is fixed in position in the direction parallel to the central axis J1. The lower openings 315 of the through-holes 311 opposed to the back iron 34 are substantially hermetically sealed against the space defined on the side of the stator 22 (see FIG. 2).

The lower openings 315 are covered preferably with an adhesive agent 6. The lower openings 315 are axially opposed to the circular plate portion 342 with a gap left therebetween. The adhesive agent 6 is arranged in the gap. Burrs formed in the course of producing the lower openings 315 are coated with the adhesive agent 6. This prevents the burrs from dropping off and generating extraneous materials.

The radial inner surface of the annular salient portion 314 is preferably inclined radially outwards as it goes downwards. A part of the radial inner surface of the circular plate portion 342 is preferably inclined radially outwards as it goes upwards. With this configuration, the radial inner surfaces of the annular salient portion 314 and the circular plate portion 342 cooperate to define a tapering gap whose axial width becomes gradually greater radially inwards. As a result, even if the adhesive agent 6 is leaked toward the stator 22 from a portion between the annular salient portion 314 and the circular plate portion 342, it is held between the annular salient portion 314 and the circular plate portion 342 by a capillary force.

Figure 4:
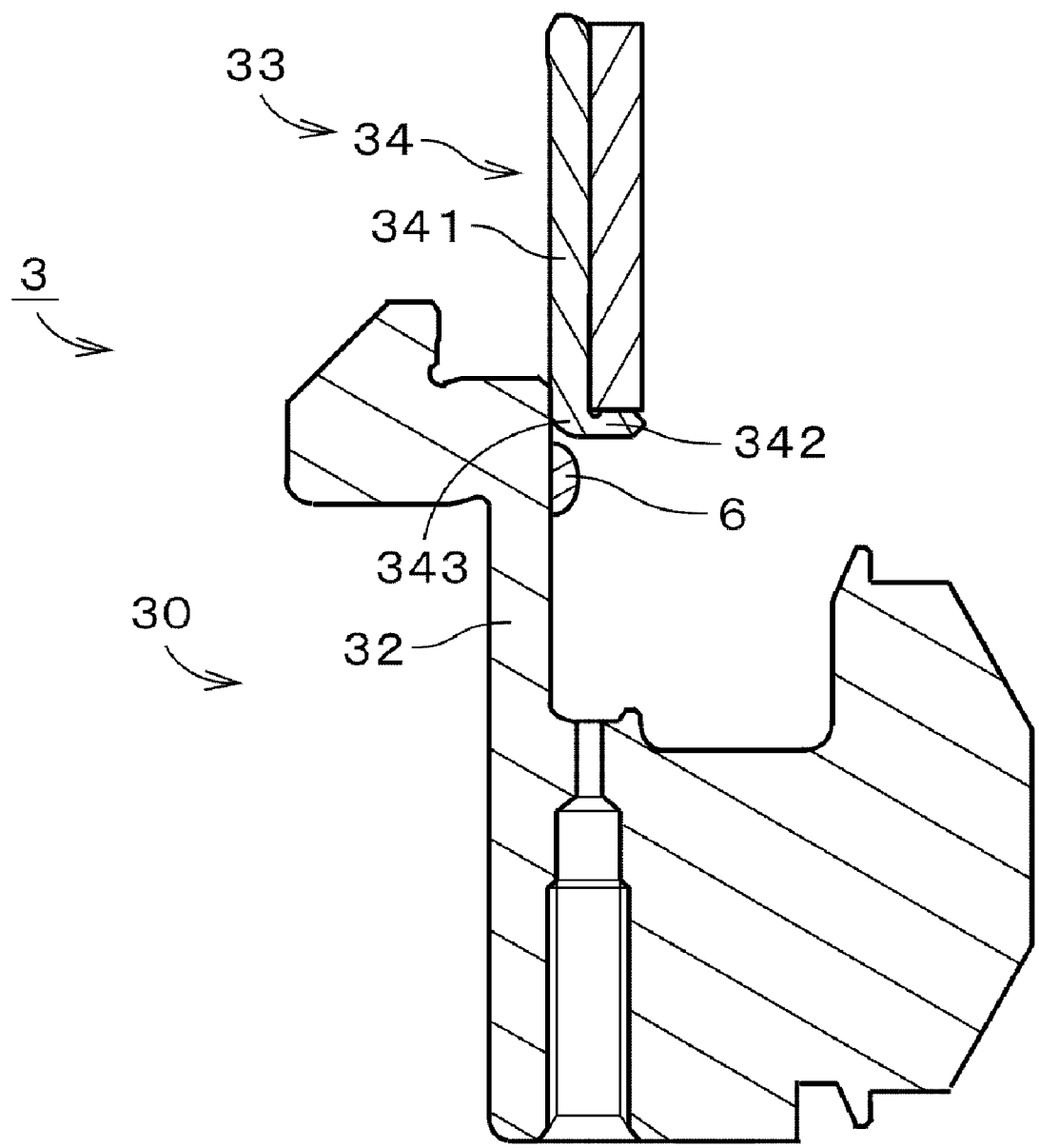
FIG. 4 is a view illustrating a rotor unit under production.
Figure 5:
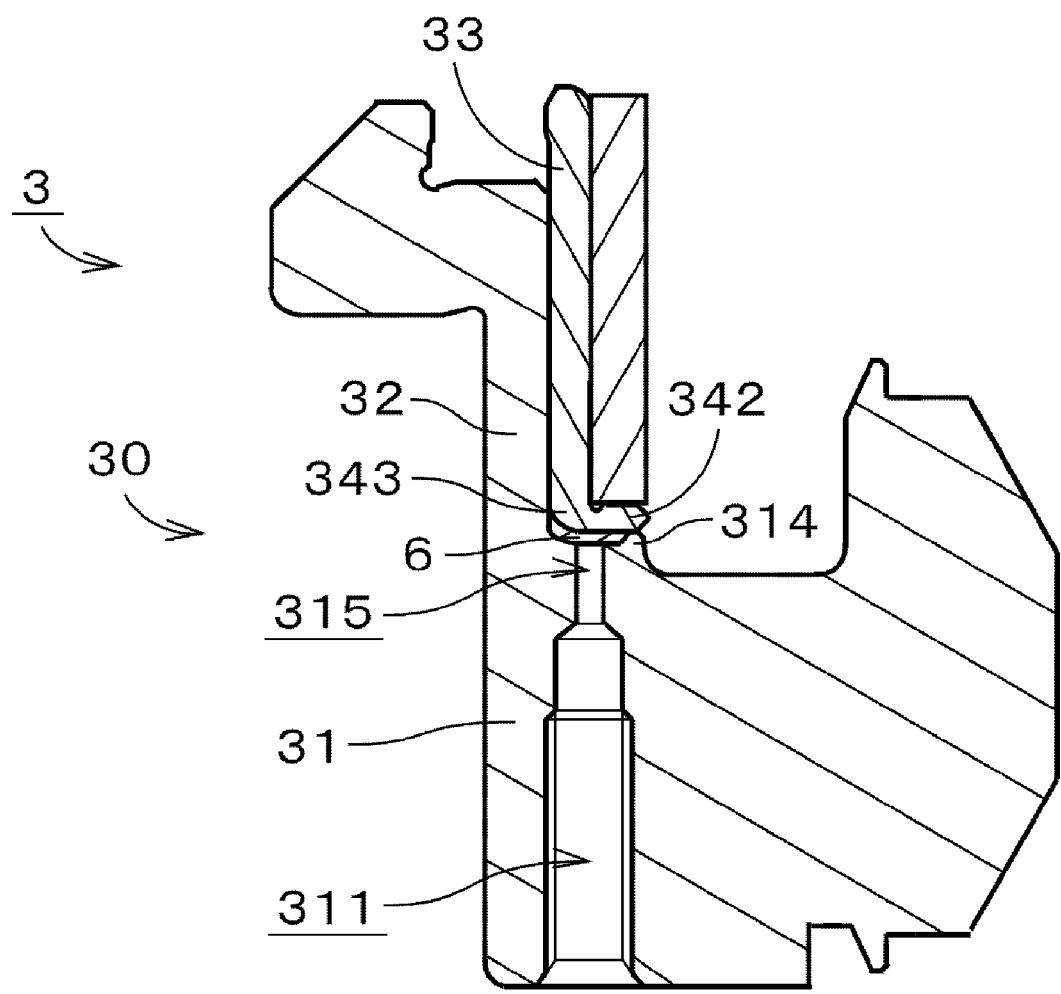
FIG. 5 is another view illustrating the rotor unit under production.

FIGS. 4 and 5 are views illustrating the rotor unit 3 under production, which views show how to attach the magnetic field generating member 33 to the rotor hub 30. In FIGS. 4 and 5, the rotor unit 3 is vertically depicted in conformity with the direction of gravity acting in the actual production process. Only the left portion of the rotor unit 3 is illustrated in an upside-down state as compared to rotor unit 3 shown in FIG. 2.

Referring to FIG. 4, the adhesive agent 6 preferably is first applied on the upper region of the inner surface of the lower cylinder portion 32 along the circumferential direction around the central axis J1. Then, the magnetic field generating member 33 is preferably inserted from above with the circular plate portion 342 of the back iron 34 faced downwards. The adhesive agent 6 is preferably pressed downwards by the corner portion 343 of the back iron 34 and is spread thin in between the inner surface of the lower cylinder portion 32 and the outer surface of the cylinder portion 341.

As shown in FIG. 5, the circular plate portion 342 preferably comes into contact with the annular salient portion 314, thereby determining the vertical position of the magnetic field generating member 33 and finalizing the insertion of the magnetic field generating member 33. At this time, the pressed adhesive agent 6 preferably stays in between the circular plate portion 342 and the cover portion 31, thus covering the lower openings 315 of the through-holes 311. The adhesive agent 6 may be, e.g., a thermally curable adhesive agent. The adhesive agent 6 is cured if the rotor unit 3 is heated in the state illustrated in FIG. 5. By way of the process set forth above, the magnetic field generating member 33 is preferably fixed to the lower cylinder portion 32, with the lower openings 315 covered by the adhesive agent 6.

As mentioned earlier, the curvature radius of the outer surface of the corner portion 343 is greater than that of the portion of the rotor unit 3 where the lower surface of the cover portion 31 meets with the inner surface of the lower cylinder portion 32. This configuration helps prevent the circular plate portion 342 from making contact with the burrs, which would otherwise occur when the lower openings 315 are positioned closer to the inner surface of the lower cylinder portion 32.

In the rotor unit 3 described above, the position of the magnetic field generating member 33 is preferably determined as the circular plate portion 342 of the back iron 34 makes contact with the annular salient portion 314 of the cover portion 31. As a consequence, the back iron 34 is prevented from making contact with the deformed portions, e.g., burrs, of the through-holes 311. This makes it possible to prevent the burrs from becoming fine particles (namely, contaminants) and infiltrating into the motor 1.

By bringing the circular plate portion 342 and the annular salient portion 314 into contact with each other, it is possible to substantially hermetically seal the lower openings 315 of the through-holes 311. This configuration helps prevent fine particles or other extraneous materials from moving to the outside of the motor 1, which makes it possible to keep clean the interior of the recording disk drive apparatus 5. Since the circular plate portion 342 makes contact with annular salient portion 314 without touching the burrs, there is no substantially possibility that the magnetic field generating member 33 is fixed out of alignment with the desired position. This assists in stabilizing the magnetic characteristics of the motor 1.

In the rotor unit 3 described above, the adhesive agent 6 is applied preferably on the lower openings 315. This makes it possible to reliably prevent the burrs from dropping from the lower openings 315 and consequently generating extraneous materials. The step of covering the lower openings 315 with the adhesive agent 6 is preferably performed simultaneously with the installation of the magnetic field generating member 33. This eliminates the need to carry out a bur removal step, a sealing step for attaching a sheet-like seal member and other steps. Therefore, it is possible to reduce the manufacturing cost.

Figure 6:
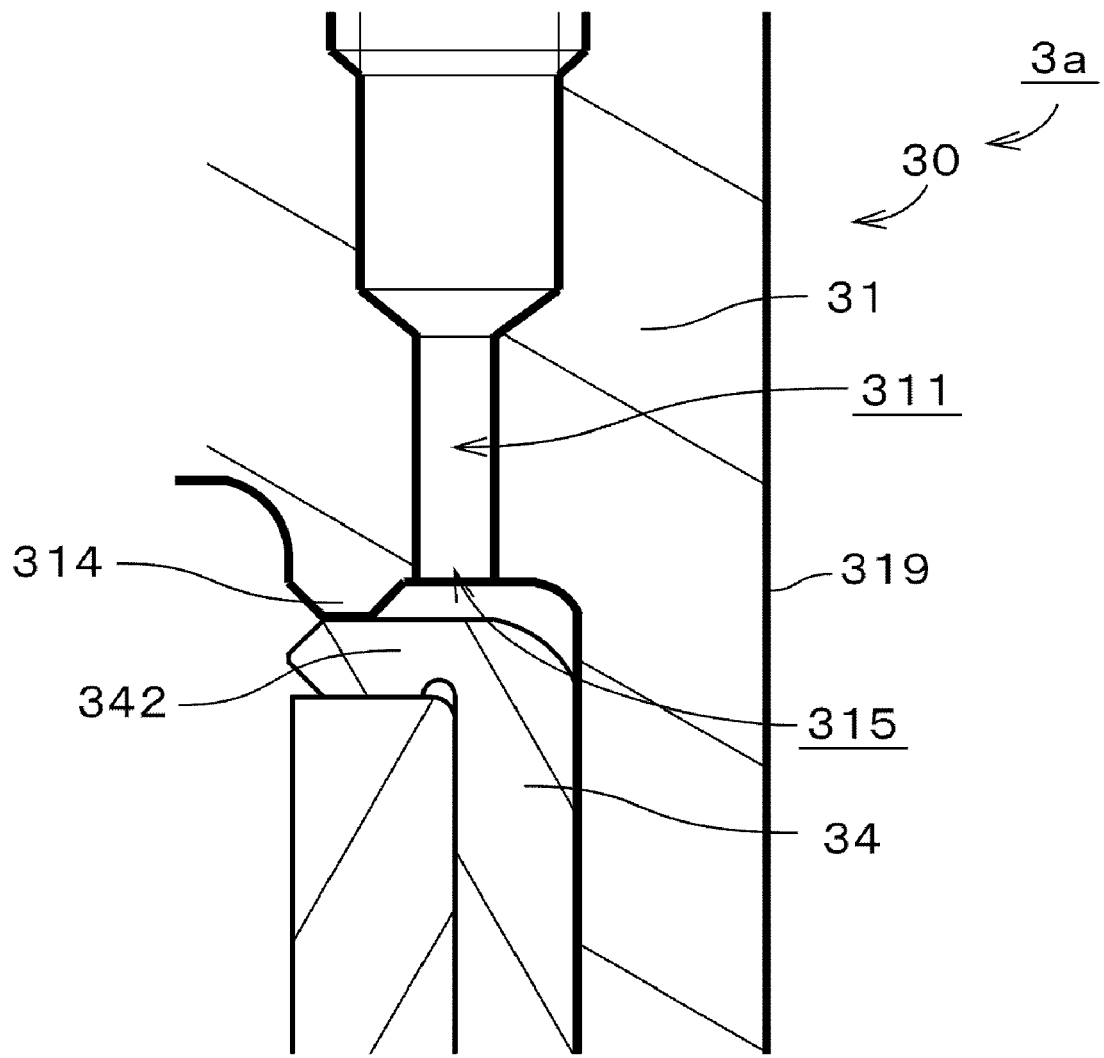
FIG. 6 is an enlarged view showing a magnetic field generating member of a motor according to a second preferred embodiment and its vicinities.

FIG. 6 is an enlarged view showing a magnetic field generating member, and its vicinities, of a motor according to a second preferred embodiment of the present invention. The rotor unit 3a of the motor according to the second preferred embodiment differs from the rotor unit 3 shown in FIGS. 2 and 3 in that the adhesive agent 6 covering the lower openings 315 is omitted. Another difference is in that the rotor hub 30 is preferably coated with a plated layer 319 in its entirety. Other structural characteristics of the present preferred embodiment of the motor are the same as those of the previous preferred embodiment.

In the manufacturing process of the rotor unit 3, the entirety of the rotor hub 30 is preferably dipped into a plating solution to perform electroless nickel plating by which the entirety of the rotor hub 30 is coated with a plated layer 319 as indicated by thick solid lines in FIG. 6. As a result, the inner surfaces of the through-holes 311 of the cover portion 31 and the portions adjacent to the lower openings 315 are coated with a plated layer 319. Since the through-hole 311 preferably functions as the thread holes of the cover portion 31 the plating solution will not stay within the thread holes during the plating process, and cleaning of the rotor hub 30 will be facilitated.

With the rotor unit 3a employed in the second preferred embodiment, the circular plate portion 342 of the back iron 34 makes contact the annular salient portion 314 of the cover portion 31. Therefore, the back iron 34 is preferably prevented from making contact with the deformed portions, e.g., burrs, of the through-holes 311. In addition, it is possible to substantially hermetically seal the lower openings 315 of the through-holes 311, thereby keeping clean the interior of the recording disk drive apparatus 5.

In the rotor unit 3a, the plated layer 319 is preferably provided to continuously extend over the entirety of the rotor hub 30 even to the first oblique bearing surfaces 312 of the central bore 313 (see FIG. 2). This makes it possible to enhance the wear resistance of the aluminum-made rotor hub 30. The formation of the plated layer 319 on the surfaces of the rotor unit 3a preferably assists in preventing generation of fine particles, which would otherwise occur due to the friction between the rotor unit 3a and the stator unit 2 or other causes.

By coating the portions near the lower openings 315 with the plated layer 319, it is possible to reliably prevent the burrs from dropping from the lower openings 315 and consequently generating extraneous materials. This makes it possible to omit a bur removal step, a step for attaching a seal member and other steps. By plating the entirety of the rotor hub 30, it is possible to simultaneously plate the bearing surfaces of the bearing mechanism 4. This leads to a reduction in the manufacturing cost of the rotor hub 30.

Figure 7:
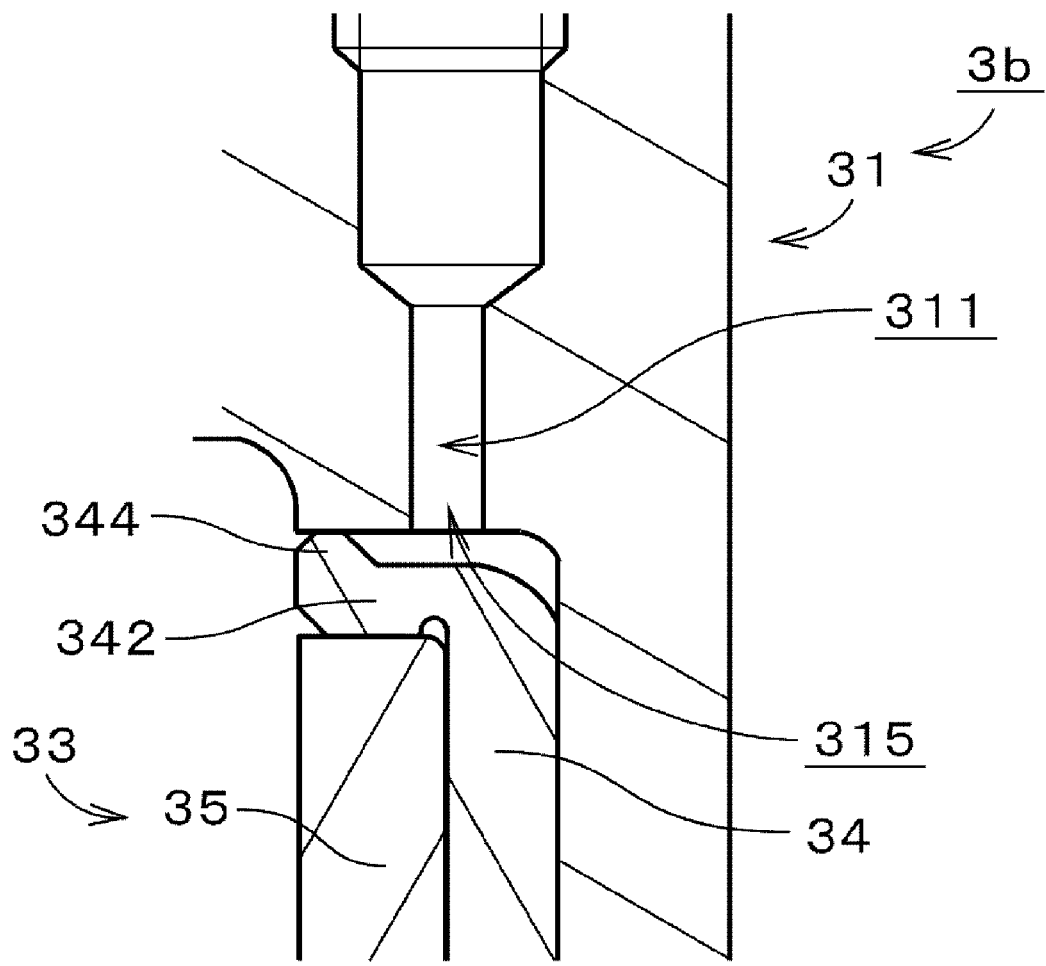
FIG. 7 is an enlarged view showing a magnetic field generating member of a motor according to a first modified example and its vicinities.

FIG. 7 is an enlarged view showing a magnetic field generating member, and its vicinities, of a motor according to a first modified example of the first preferred embodiment. The motor according to the first modified example remains the same as the motor 1 of the first preferred embodiment, except the differences in the shape of the cover portion 31 and the magnetic field generating member 33 of the rotor unit 3b.

As shown in FIG. 7, the lower surface of the cover portion 31 near the lower openings 315 preferably include a planar annulus shape. The magnetic field generating member 33 preferably includes a substantially cylindrical rotor magnet 35 and a back iron 34 arranged to cover the outer surface and upper surface of the rotor magnet 35. An upwardly-protruding annular salient portion 344 is preferably provided in the radial inner region of the upper surface of the circular plate portion 342, i.e., the upper portion of the back iron 34.

In the rotor unit 3b, the annular salient portion 344 preferably makes contact with the cover portion 31. Therefore, the back iron 34 is prevented from making contact with the deformed portions, e.g., burrs, of the through-holes 311. This prevents the burrs from becoming fine particles and infiltrating into the motor. In addition, it is possible to substantially hermetically seal the lower openings 315 of the through-holes 311, thereby keeping clean the interior of the recording disk drive apparatus 5.

The lower openings 315 of the through-holes 311 in the rotor unit 3b are coated with an adhesive agent or a plated layer (not shown) in a manner similar as the rotor unit 3 shown in FIG. 3 and the rotor unit 3a illustrated in FIG. 6. This makes it possible to even reliably prevent the burrs from dropping from the lower openings 315 and generating extraneous materials, without having to carry out a bur removal step, a step for attaching a seal member and other steps.

Figure 8:
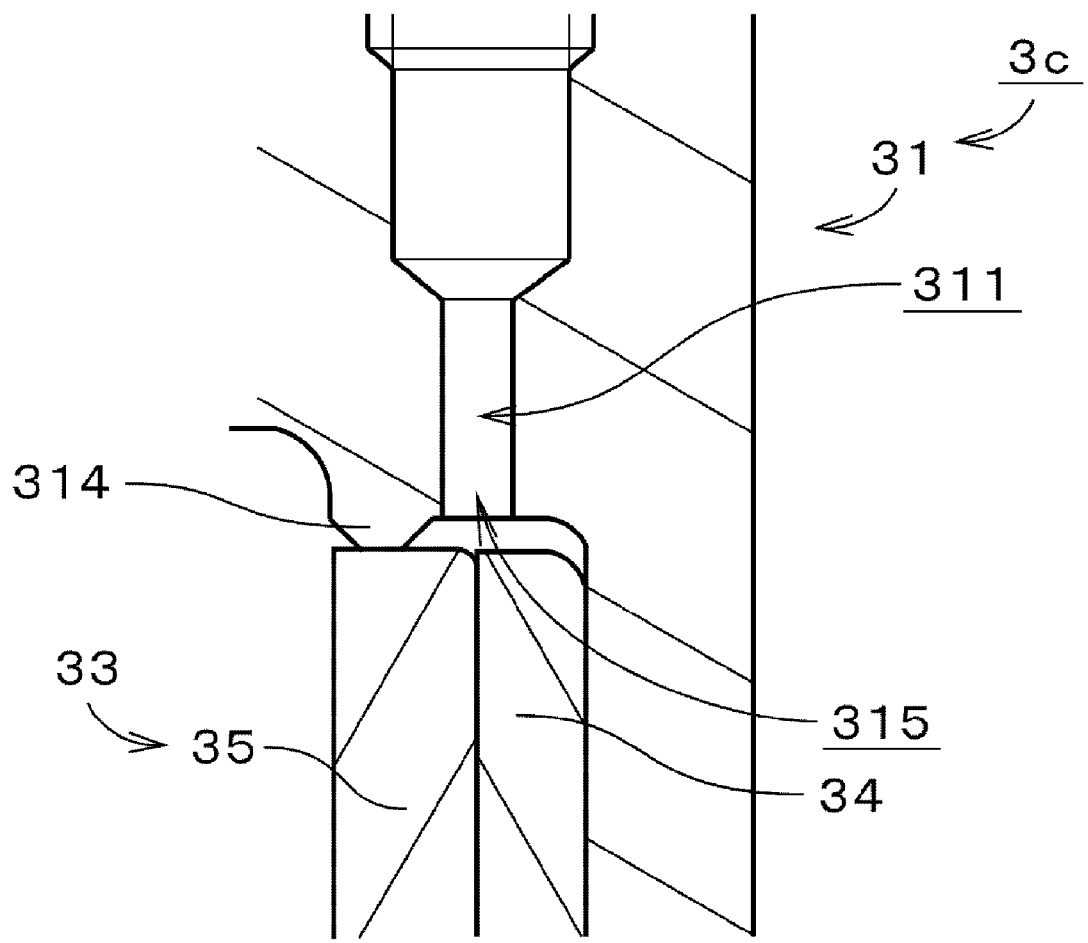
FIG. 8 is an enlarged view showing a magnetic field generating member of a motor according to a second modified example and its vicinities.

FIG. 8 is an enlarged view showing a magnetic field generating member, and its vicinities, of a motor according to a second modified example of the first preferred embodiment. The motor according to the second modified example remains the same as the motor 1 of the first preferred embodiment, except the difference in the shape of the magnetic field generating member 33 of the rotor unit 3c.

As shown in FIG. 8, a downwardly-protruding annular salient portion 314 like the one shown in FIG. 3 is preferably provided on the lower surface of the cover portion 31. The magnetic field generating member 33 preferably includes a substantially cylindrical rotor magnet 35 and a back iron 34 arranged to cover only the outer surface of the rotor magnet 35. The upper surface of the rotor magnet 35 and the upper surface of the back iron 34 are substantially flush with each other in the direction parallel to the central axis J1 (see FIG. 2).

In the rotor unit 3c, the lower end of the annular salient portion 314 of the cover portion 31 preferably makes contact with the upper surface of the rotor magnet 35. Therefore, the back iron 34 is prevented from making contact with the deformed portions, e.g., burrs, of the through-holes 311. In addition, it is possible to substantially hermetically seal the lower openings 315 of the through-holes 311, thereby keeping clean the interior of the recording disk drive apparatus 5. The lower openings 315 of the through-holes 311 in the rotor unit 3c are coated with an adhesive agent or a plated layer. This makes it possible to reliably prevent the burrs from dropping from the lower openings 315 and generating extraneous materials. This holds true in the embodiments and the modified examples to be set forth below.

Figure 9:
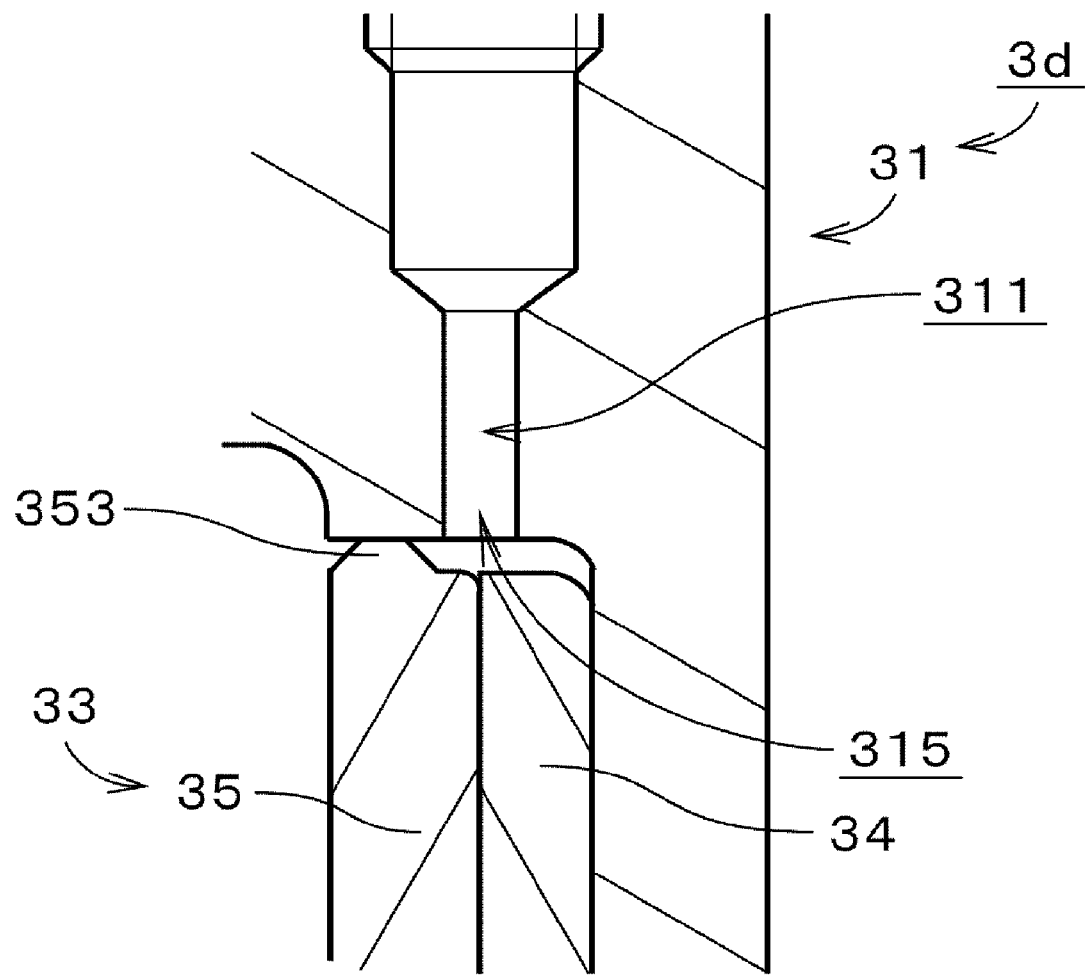
FIG. 9 is an enlarged view showing a magnetic field generating member of a motor according to a third modified example and its vicinities.

FIG. 9 is an enlarged view showing a magnetic field generating member, and its vicinities, of a motor according to a third modified example of the first preferred embodiment.

The motor according to the third modified example remains the same as the motor of the first modified example shown in FIG. 7, except the difference in the shape of the magnetic field generating member 33 of the rotor unit 3d.

The lower surface of the cover portion 31 near the lower openings 315 preferably includes a planar annulus shape. The magnetic field generating member 33 preferably includes a substantially cylindrical rotor magnet 35 and a back iron 34 arranged to cover only the outer surface of the rotor magnet 35. An upwardly-protruding annular salient portion 353 whose radial width gets gradually smaller upwards is preferably provided on the upper surface of the rotor magnet 35. The upper end of the annular salient portion 353 of the rotor magnet 35 is preferably arranged higher than the upper end of the back iron 34.

In the rotor unit 3d, the upper end of the annular salient portion 353 makes contact with the lower surface of the cover portion 31 at the radial inner side of the lower openings 315. With this configuration, the back iron 34 is prevented from making contact with the deformed portions, e.g., burrs, of the through-holes 311. In addition, it is possible to substantially hermetically seal the lower openings 315 of the through-holes 311, thereby keeping clean the interior of the recording disk drive apparatus 5.

Figure 10:
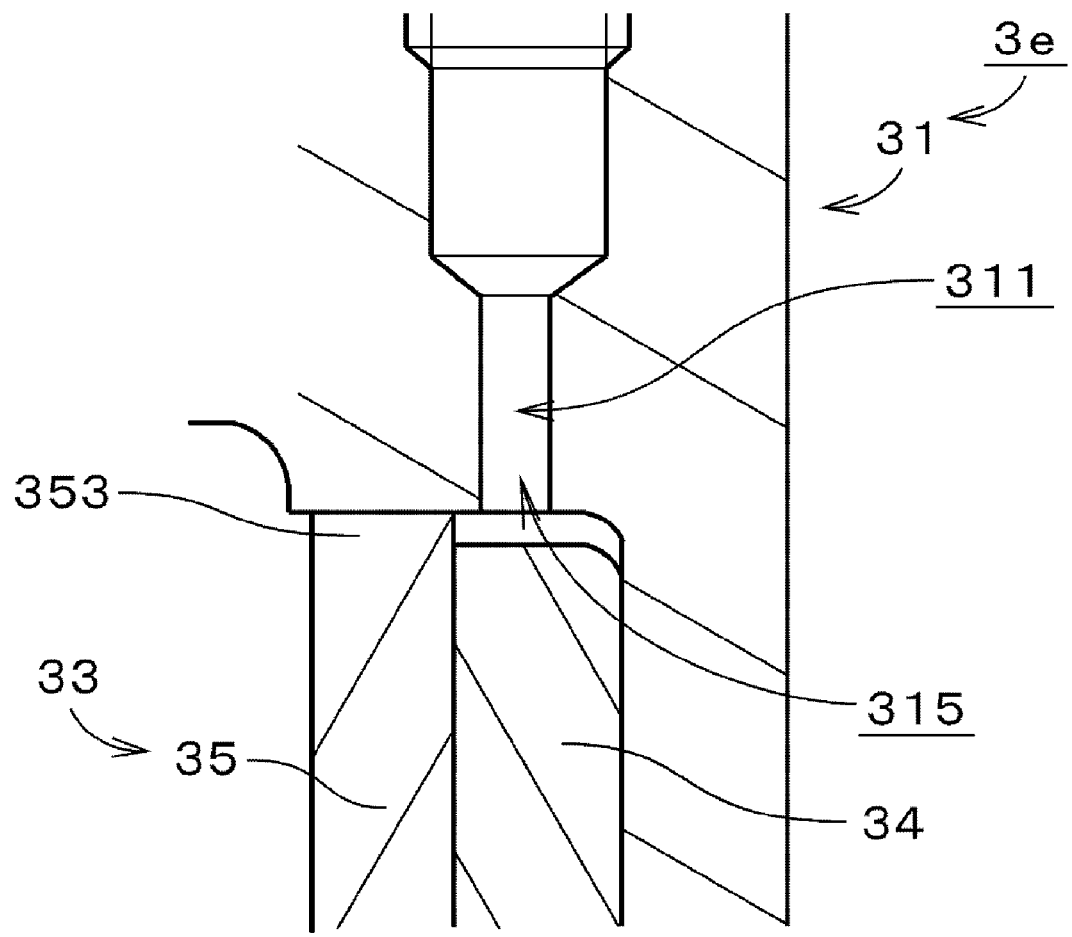
FIG. 10 is an enlarged view showing a magnetic field generating member of a motor according to a fourth modified example and its vicinities.

FIG. 10 is an enlarged view showing a magnetic field generating member, and its vicinities, of a motor according to a fourth modified example of the first preferred embodiment. The motor according to the fourth modified example remains the same as the motor of the third modified example shown in FIG. 9, except the difference in the shape of the magnetic field generating member 33 of the rotor unit 3e.

In the rotor unit 3e, the back iron 34 preferably includes an increased radial thickness. The upper surface of the back iron 34 is preferably opposed to the lower openings 315. The rotor magnet 35 preferably includes a substantially uniform thickness up to the upper end thereof. The upper end of the rotor magnet 35 is preferably arranged higher than the upper end of the back iron 34. Thus, the upper portion of the rotor magnet 35 defines an upwardly-protruding annular salient portion 353.

In the rotor unit 3e, the upper end of the annular salient portion 353 makes contact with the lower surface of the cover portion 31 at the radial inner side of the lower openings 315. The back iron 34 is prevented from making contact with the deformed portions, e.g., burrs, of the through-holes 311. In addition, it is possible to hermetically seal the lower openings 315 of the through-holes 311, thereby keeping clean the interior of the recording disk drive apparatus 5.

Figure 11:
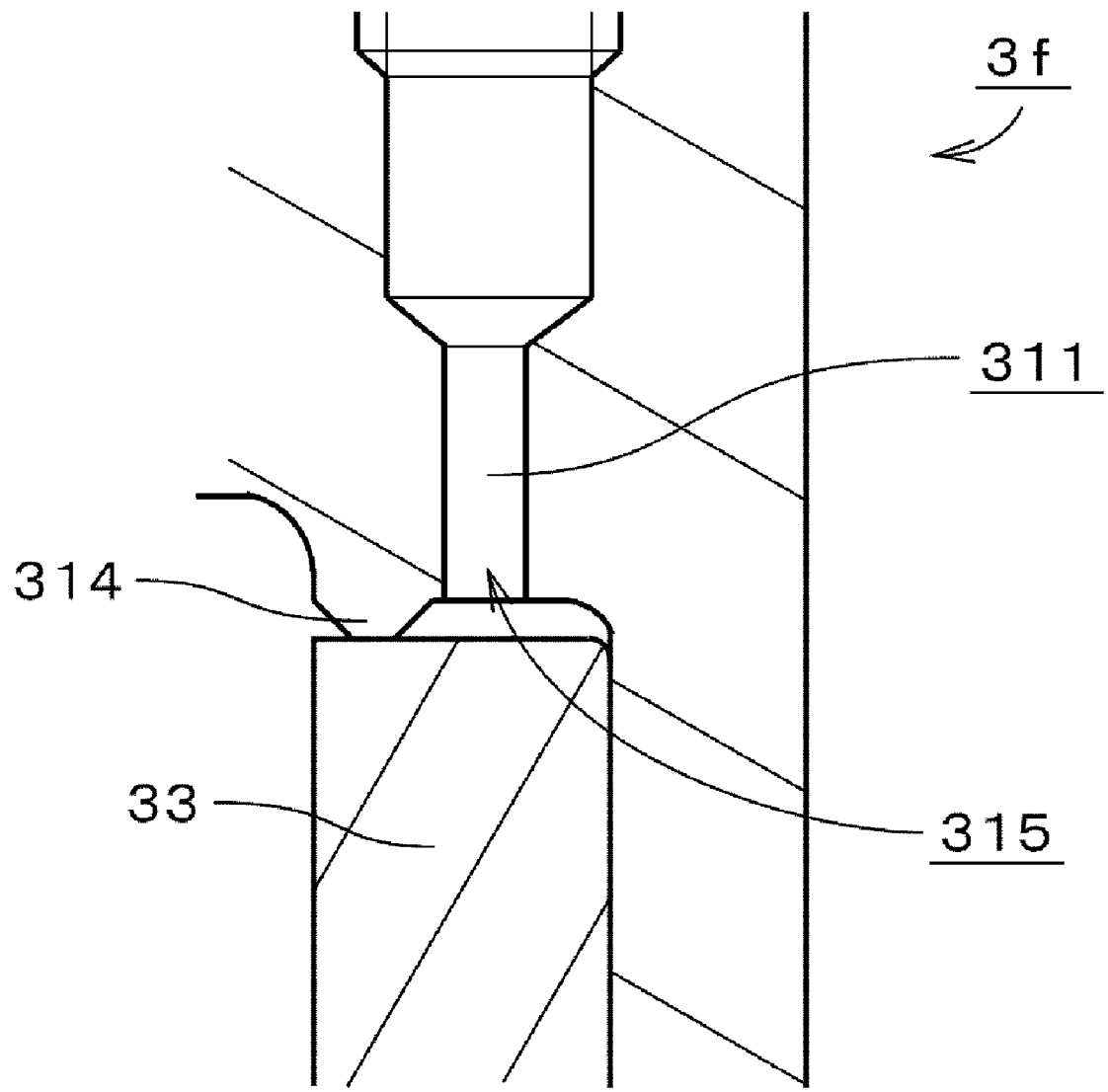
FIG. 11 is an enlarged view showing a magnetic field generating member of a motor according to a third preferred embodiment and its vicinities.

FIG. 11 is an enlarged view showing a magnetic field generating member, and its vicinities, of a motor according to a third preferred embodiment of the present invention. The motor according to the third preferred embodiment remains the same as the motor 1 shown in FIGS. 2 and 3, except that the magnetic field generating member 33 of the rotor unit 3f includes only a rotor magnet.

The magnetic field generating member 33 of the rotor unit 3f preferably includes a cylindrical rotor magnet with a substantially uniform radial thickness. The upper surface of the magnetic field generating member 33 preferably includes a substantially planar shape. In the rotor unit 3f, the lower end of the annular salient portion 314 makes contact with the upper surface of the magnetic field generating member 33 at the radial inner side of the lower openings 315. The magnetic field generating member 33 is prevented from making contact with the deformed portions, e.g., burrs, of the through-holes 311. In addition, it is possible to hermetically seal the lower openings 315 of the through-holes 311, thereby keeping clean the interior of the recording disk drive apparatus 5.

As a modified example of the third preferred embodiment, the inner upper end portion of the magnetic field generating member 33 may be configured to axially protrude higher than the outer upper end portion thereof. In this case, the inner upper end portion of the magnetic field generating member 33 would define an annular salient portion that makes contact with the cover portion.

While description has been made on the preferred embodiments of the present invention and their modified examples, the present invention is not limited thereto. Various modifications and changes may be made without departing from the scope of the invention.

For example, the rotor hub 30 may define at least the cover portion 31 of the rotor unit 3 and may dispense with the lower cylinder portion 32. In this case, the magnetic field generating member 33 may be attached to the cover portion 31.

The rotor hub 30 is not limited to the type that includes some parts of the bearing mechanism 4. A sleeve into which the shaft portion 41 is inserted may be added as an independent member. In this case, the rotor hub 30 is preferably made of aluminum, the sleeve being preferably made of stainless steel, sintered metal or other materials with increased wear resistance. The through-holes 311 of the cover portion 31 may be used not only as thread holes for fixing the clamper 54 but also as, e.g., balance-adjusting holes.

The bearing mechanism 4 are not limited to the first oblique bearing surfaces 312 of the cover portion 31 and the second oblique bearing surfaces 413 of the shaft portion 41 shown in FIG. 2. Other bearing structures may be used in place thereof. For example, it may be possible to independently provide a radial bearing unit arranged to radially support the shaft portion and a thrust bearing unit arranged to support the shaft portion in the direction of the central axis J1.

The method of coating the lower openings 315 with the adhesive agent 6 is not limited to the one illustrated in FIGS. 4 and 5. As an alternative example, it may be possible for a worker to directly apply an adhesive agent on the lower openings prior to attaching the magnetic field generating member. In this case, the magnetic field generating member may be attached to the lower cylinder portion by press-fit without resort to an adhesive agent.

The plated layer may be provided by other methods than the electroless nickel plating method, e.g., by an electroplating method or a vapor deposition method. The lower openings may be coated with other conductive layers than the plated layer.

The annular salient portion provided radially inwards of the lower openings 315 lying between the cover portion 31 and the magnetic field generating member 33 may be other types than described in respect of the respective preferred embodiments and the modified examples thereof. In other words, the annular salient portion may have any other shape, insofar as it protrudes annularly about the central axis J1 from one of the cover portion and the magnetic field generating member to make contact with the other.

The motor 1 may be a shaft-rotating type in which the shaft is fixed to the rotor unit 3. The recording disk drive apparatus 5 may be an apparatus capable of driving optical disks, magneto-optical disks or other disks. The motor 1 provided with the bearing mechanism 4 is suitable for use in a recording disk drive apparatus that can perform one or both of the information writing and reading tasks with respect to the recording disks 51. The motor 1 may be used in a laser printer or other devices.

The motor according to the present invention can be used in various kinds of recording disk drive apparatuses for performing a reading or writing task of information with respect to a recording disk or various kinds of other devices such as a laser printer and the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor, comprising:
   a stator unit with a stator;
   a substantially cylindrical closed-top rotor unit, the stator arranged inside the rotor unit; and
   a bearing mechanism arranged to support the rotor unit in such a manner as to permit rotation of the rotor unit about a central axis with respect to the stator unit, wherein
   the rotor unit includes a rotor hub, which defines at least a cover portion of the rotor unit, and an annular magnetic field generating member arranged below the cover portion and outside the stator;
   the cover portion of the rotor unit includes a through-hole and a lower opening positioned arranged opposed to the magnetic field generating member at a lower portion of the through hole; and
   one of the cover portion and the magnetic field generating member includes an annular salient portion provided radially inwards of the lower opening, the annular salient portion protruding annularly about the central axis toward, and making contact with, the other of the cover portion and the magnetic field generating member.

2. The motor of claim 1, wherein the lower opening is applied with an adhesive agent.

3. The motor of claim 1, wherein at least a region of the cover portion near the lower opening is coated with a plated layer.

4. The motor of claim 3, wherein
   the stator unit includes a shaft portion;
   the rotor hub includes an inner surface including a circumferential surface arranged to define a vertically-pierced central bore and a bearing surface joined to the circumferential surface;
   the shaft portion is inserted into the central bore, defining the bearing mechanism including a lubricant filled between the shaft portion and the inner surface of the rotor hub to generate a fluid dynamic pressure; and
   the inner surface is coated with the plated layer.

5. The motor of claim 1, wherein
   the annular salient portion protrudes downwards from the cover portion;
   the magnetic field generating member includes a substantially cylindrical rotor magnet and a back iron, the back iron including a cylinder portion arranged to cover an outer surface of the rotor magnet and a circular plate portion arranged to cover an upper surface of the rotor magnet; and
   a lower end of the annular salient portion is arranged to make contact with the circular plate portion of the back iron.

6. The motor of claim 5, wherein the circular plate portion and the lower opening are axially opposed to each other with a gap therebetween.

7. The motor of claim 6, wherein an adhesive agent is provided in the gap to cover the lower opening.

8. The motor of claim 5, wherein at least a region of the cover portion near the lower opening is coated with a plated layer.

9. The motor of claim 5, wherein
   the magnetic field generating member includes a corner portion positioned between an outer surface of the cylinder portion and an upper surface of the circular plate portion to join the outer surface of the cylinder portion and the upper surface of the circular plate portion together;
   the rotor unit includes a lower cylinder portion protruding downwards from an outer edge of the cover portion; and
   a curvature radius of an outer surface of the corner portion is greater than a curvature radius of a portion of the rotor unit where a lower surface of the cover portion meets an inner surface of the lower cylinder portion.

10. The motor of claim 1, wherein
    the annular salient portion protrudes downwards from the cover portion;
    the magnetic field generating member includes a substantially cylindrical rotor magnet and a back iron arranged to cover an outer surface of the rotor magnet; and
    the annular salient portion is arranged to make contact with an upper portion of the rotor magnet at a lower end thereof.

11. The motor of claim 1, wherein the magnetic field generating member includes a substantially cylindrical rotor magnet, the rotor magnet including an upper portion arranged to define the annular salient portion, the upper portion of the rotor magnet arranged to make contact with the cover portion.

12. The motor of claim 11, wherein the magnetic field generating member further includes a back iron arranged to cover an outer surface of the rotor magnet, the rotor magnet including an upper end arranged higher than an upper end of the back iron in an axial direction.

13. The motor of claim 1, wherein
    the magnetic field generating member includes a substantially cylindrical rotor magnet, and a back iron arranged to cover outer and upper surfaces of the rotor magnet, and
    the back iron includes an upper radial inner portion arranged to define the annular salient portion, the annular salient portion protruding upwards and making contact with the cover portion.

14. A recording disk drive apparatus, comprising:
    the motor of claim 1 arranged to rotate a recording disk;
    an access unit arranged to perform a task of reading or writing information with respect to the recording disk; and
    a housing arranged to accommodate the motor and the access unit.

* * * * *